United States Patent [19]

Shaver

[11] 4,444,894
[45] Apr. 24, 1984

[54] SILICON CARBIDE AND CARBON STRUCTURES AND METHOD OF MAKING

[75] Inventor: Robert G. Shaver, Springfield, Va.

[73] Assignee: Versar Inc., Springfield, Va.

[21] Appl. No.: 437,658

[22] Filed: Oct. 29, 1982

[51] Int. Cl.$^3$ .................. C04B 35/52; C04B 35/56
[52] U.S. Cl. ............................................... 501/90
[58] Field of Search ........................ 501/90; 423/449

[56] References Cited

U.S. PATENT DOCUMENTS

| 3,673,101 | 6/1972 | McKenney, Jr. et al. | 202/137 |
| 4,229,425 | 10/1980 | Shaver et al. | 423/449 |
| 4,237,107 | 12/1980 | Gillot et al. | 423/449 |

*Primary Examiner*—James Poer
*Attorney, Agent, or Firm*—Dowell & Dowell

[57] ABSTRACT

The process of manufacturing shaped structures comprising silicon carbide and carbon, including forming precursors of heat carbonizable synthetic resin material having dispersed therein siliceous material, heating a batch of precursors to a temperature in the range of 2000° F. to 3000° F. while confining them within a graphite boat which substantially surrounds the precursors except for small openings sufficient to circulate gases through the boat, maintaining the heating of the boat and the batch for a time in the range of 4 to 24 hours to carbonize the resin material and promote solid state reactions between the carbon formed from the resin material and the siliceous material, while continuously flushing the boat with inert gases, subsequently removing the heated boat containing the batch and immediately confining it in an unheated chamber in the presence of an inert atmosphere until the boat and batch are cooled below the auto-ignition temperature of carbon in air, and recovering the shaped silicon carbide and carbon structures from the boat. The product of the process forms part of this disclosure and can be further processed to remove uncombined siliceous materials by treating with hydrofluoric acid.

12 Claims, 3 Drawing Figures

SILICON CARBIDE AND CARBON STRUCTURES AND METHOD OF MAKING

BACKGROUND AND PRIOR ART

This invention relates to a pyrolytic process for making shaped structures of carbon and silicon carbide, starting with formed precursors having walls made of a resin which is heat-degradable to carbon, and in which is dispersed siliceous material such as pulverized silica or glass which combines when heated with carbon in the resin to form silicon carbide.

This process is especially useful in making a new article of manufacture comprising silicon carbide and carbon macrospheres which are of the order of one half to eleven millimeters in diameter and which are especially useful as fillers in high-temperature composites, and in other applications wherein such characteristics as resistance to high-temperature, wall porosity, and low electrical impedance are important.

This process includes the step of pyrolytic heating which can be done in apparatus of the type disclosed and claimed in Shaver and Leake U.S. Pat. No. 4,279,702. Moreover, the present process resembles the teachings of Shaver and Leake U.S. Pat. No. 4,229,425, as far as the heating and cooling steps are concerned. However, the patented process without changes would not make silicon carbide structures, partly because the steps of the process would not heat the precursors long enough, and partly because the starting material does not contain the necessary ingredients to form silicon carbide.

U.S. Pat. No. 3,673,101 to McKenney et al teaches a process for making metal carbide plus carbon microspheres using ion exchange resin spheres which are externally coated with metal salt and heated to convert the metal salt to a carbide. However in this process, the carbon merely serves as a support and does not take part in the process of forming a carbide.

U.S. Pat. No. 3,264,073 to Schmitt coats phenolic microspheres with a metal, and then heats them in a hydrogen atmosphere to remove the carbon and leave the metal.

A range of degradable materials from which the original precursors can be formed includes polymers of alkyd or phenol resins or polyurethanes, according to an article in Chemical Abstracts, Vol. 73, 1970, page 36, abstract 110,604g.

THE DISCLOSED INVENTION

This invention teaches a process, and the product thereof, for making formed structures whose walls are a composite of carbon and silicon carbide. In order to produce these structures a preferred embodiment of the process starts with a precursor made of a synthetic that can be heat-degraded to produce carbon, such as a phenolic resin, and forms shaped hollow objects, typically spheres, which can be formed on a core that will shrink to insignificance when heated during curing of the resin. A satisfactory core material would be styrofoam. In order to provide the material of the spheres with silica which is needed to combine with the carbon of the resin to form silicon carbide, the phenolic resin is mixed before forming with pulverized silica or glass, so that the silica is well dispersed in the resin in proper, preferably stoichiometric, proportion to form silicon carbide. A manufactured commercial product is available for this purpose which provides satisfactory, but not optimum, proportions of phenolic resin and silica. This material is 3M Brand Macrospheres which comprise straw colored spheres having a matrix of phenolic resin with glass microballoons embedded therein for strength and low weight. The microballoons range around 20 to 130 microns in diameter. The 3M Macrospheres are commercially available in four size ranges, from about ½ to 11 millimeters in diameter. According to the present process, these macrospheres are placed in a batch in an oven and heated to a temperature within a range from 2000° F. to 3000° F. in an inert atmosphere, the optimum set point being around 2700° F. After about four hours, the phenolic resin is carbonized, but the degree of combining of the resulting carbon with the silica is still minimal. Therefore, the heating is further continued to a total of about 4 to 24 hours, at which time a high degree of combining has occurred. If the silica is finely enough pulverized and uniformly dispersed in the resin before the heating process starts, such a heating step will convert most of the silica to silicon carbide. However, where 3M Brand Macrospheres are used so that the silica is present as glass balls of considerable diameter, the conversion efficiency is reduced to about 50% conversion to silicon carbide. This is true because the conversion can only take place at points of contact between the carbon and the glass which tends to fuse into droplets of reduced surface to volume ratio. Ultimately after sufficient heating has occurred so that the desired degree of conversion is reached, the spheres are removed from the oven and placed in a cooling chamber which is also provided with an inert atmosphere to reduce the tendency of the surfaces of the spheres to oxidize. In cases where it is desired to have the macrospheres contain only carbon and silicon carbide, the cooled spheres can be treated with hydrofluoric acid to dissolve out any remaining silica or glass. Although the process is performed mainly in connection with macrospheres, it can be used as well with microspheres or even with solid spheres or other structural shapes so long as the resin containes a proper dispersion of silica or silicon bearing material.

OBJECTS AND ADVANTAGES OF THE INVENTION

It is a principal object of this invention to make shaped silicon carbide plus carbon structures, such as spheres and hollow spheres, from pre-shaped precursors formed of a synthetic material which is heat-degradable into carbon and which contains a proper dispersion of silica or silicon containing material, the silicon carbide being formed by solid state reaction of carbon from the synthetic material as it is degraded with the dispersed silica.

It is another object of the invention to provide a process in which shrinkage in size of the final product as compared with the size of the precursor is substantially avoided during the heating and cooling steps.

A further object of the invention is to avoid insofar as possible degrading by oxidation of the surfaces of the finished product during the heating and cooling steps, not only by performing these steps in an inert atmosphere, but also by enclosing the precursor spheres in a covered graphite boat, the graphite of which serves a sacrificial function to protect the carbon of the spheres.

Another object of the invention is to provide a novel product of the above process, which product has a controllable proportion of carbon to silicon carbide, which proportion can be controlled easily by controlling the time interval of heating of the precursor since the carbon tends to form first and additional time is required to convert silica which is present to silicon carbide. The proportion of carbon to silicon carbide can be varied at will to affect the mechanical and electrical properties of the product. The resulting product also has a low electrical impedance, and excellent high-temperature properties which can be enhanced by removing any remaining glass like siliceous components by dissolving them out using hydrofluoric acid.

One major advantage of the invention is that it uses only very common and inexpensive starting materials including phenolic resin and silica or glass, and does not require the use of less economical chemical components such as are required to perform prior art processes for manufacturing silicon carbide plus carbon products as set forth in one of the patents mentioned above in this disclosure.

Other objects and advantages of this invention will become apparent during the following discussion of the drawing.

THE DRAWING

FIG. 1 of the drawing is a flow diagram showing the preferred process of the present invention for making silicon carbide plus carbon products starting with a degradable synthetic resin precursor having silica or silicon containing materials mixed with the synthetic resin;

FIG. 2 is a cross-sectional view of a precursor sphere which is useable with the process shown in FIG. 1; and FIG. 3 is an elevational view of a slicon carbide and carbon sphere made according to this process.

DESCRIPTION OF PREFERRED EMBODIMENTS

Figure 1:
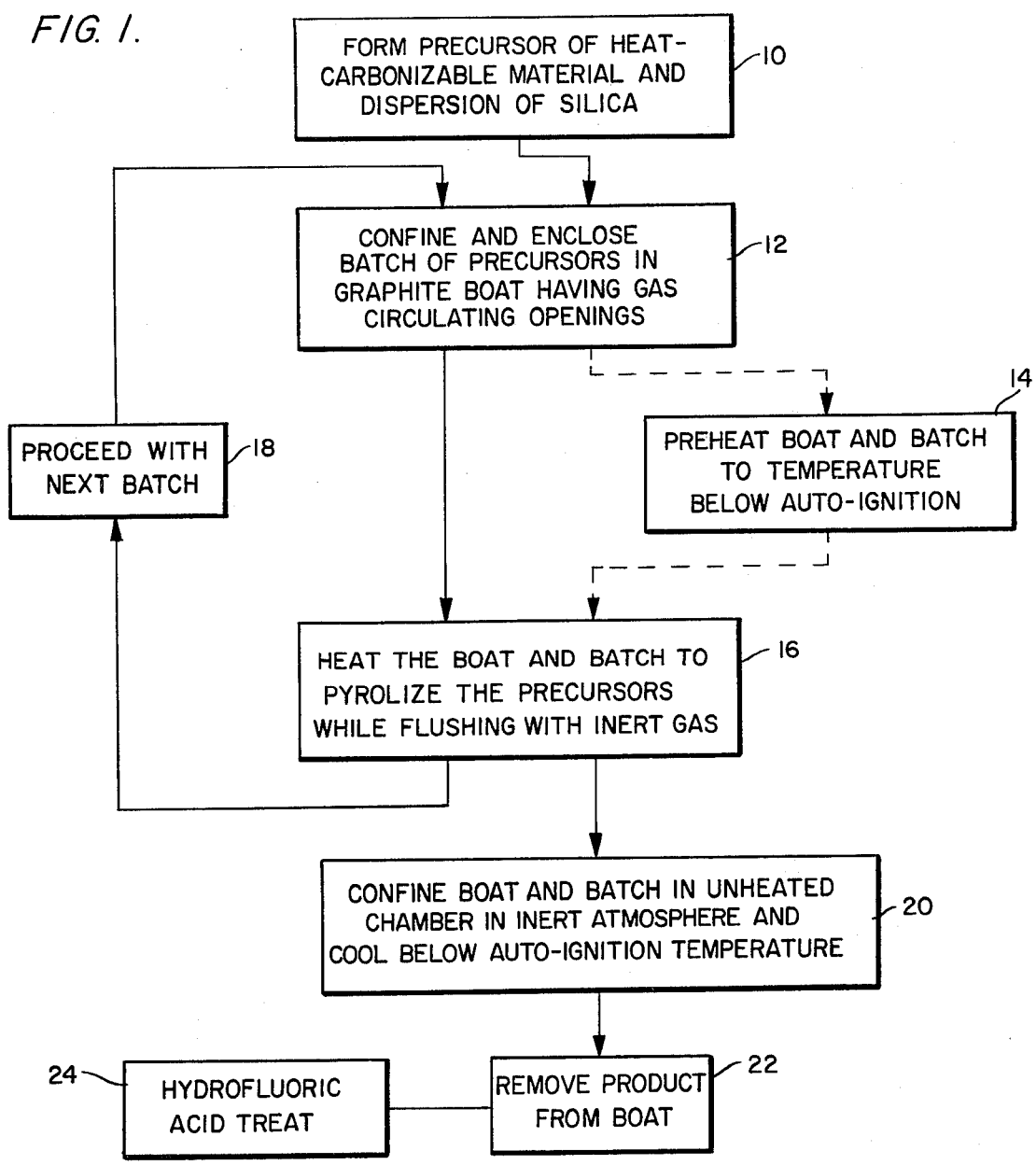
Figure 2:
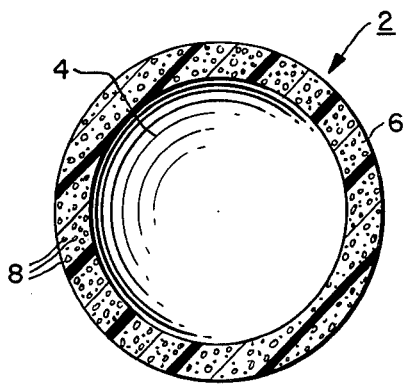

Referring now to the drawings, FIG. 1 shows a preferred process for treating a suitable precursor, a typical one of which is shown in FIG. 2. As stated above the precursor can be made by forming to a desired shape synthetic resin containing dispersed therein silica or a silicon containing material, and then curing the resin sufficiently to produce a dimensionally stable structure. Alternatively the precursor can be a purchased item such as the 3M Brand Microspheres in which the silicon appears in the form of glass microspheres having diameters of the order of 20 to 130 microns.

FIG. 2 shows a precursor 2 having a hollow interior 4. The sphere 2 comprises a practical embodiment with side-walls in the form of a spongy matrix of phenolic resin 6 having dispersed therein siliceous material 8 comprising, for example, finely pulverized silica, or glass microspheres, or both. The siliceous material is included preferably in stoichiometric quantity relative to the carbon which results from pyrolyzing the resin, although less silica can be used where the desired end product should contain an increased proportion of uncombined carbon relative to silicon carbide.

FIG. 1 shows a flow diagram listing the steps of a preferred process. The step represented by block 10 relates to the forming of suitable precursor structures of the general type represented by FIG. 2 and including walls made of synthetic resin material 6 which is heat degradable to carbon, and the precursor walls containing dispersed therein siliceous material such as silica, glass or other silicon containing material which will combine with carbon under heat to form silicon carbide.

The step 10 can of course be eliminated in the event that a manufactured precursor is purchased for use in step 12 of the process, such as the 3M Brand Macrospheres containing glass microspheres in the resin matrix.

The step represented by the block 12 comprises loading the precursor batch into a graphite boat and confining the batch therein by enclosing the boat with a loose fitting cover leaving openings to allow circulation of an inert gas through the boat during the subsequent oven heating process to carry out oxygen and flush out other gases given off from the precursor batch during pyrolyzing thereof. In this regard, a suitable apparatus for carrying out the process is shown in FIG. 2 of U.S. Pat. No. 4,279,702 (supra).

In the third step represented by the block 16 the graphite boat containing the precursor batch is inserted into the heated oven which is maintained at a temperature of between 2000° F. and 3000° F. by automatic means as shown in U.S. Pat. No. 4,279,702, and the temperature of the boat and batch begins rising toward the pyrolyzing temperature of the resin and therebeyond. A typical set point temperature is about 2700° F. Since the walls of the precursors are fairly porous, the heating of the batch can be carried out fairly quickly without slowing the heating to allow the gases inside the spheres to escape. Initially, the resin is degraded to the point where only a carbon sponge remains, but it takes 4 to 24 hours for the siliceous material to combine with carbon with which it is in contact to form silicon carbide in optimum quantity. The lesser residence time in the range given for heating would be sufficient where the siliceous material is very finely pulverized so that much contact is had with the carbon. However, where the siliceous material is glass microspheres, in this example about 20 to 130 microns in diameter, the conversion of the silica in the glass to silicon carbide will be much slower because the glass tends to agglomerate into droplets which have less area of contact with the carbon than would finely divided silica. This type of precursor requires a longer resident heating time up to 24 hours, and even then will result in conversion of a much smaller percentage of the silicon to silicon carbide. Control of the proportion of uncombined carbon to silicon carbide in the finished product can thus be controlled by the heating time and by varying the degree of pulverization of the siliceous material, as well as by the amount of siliceous material initially dispersed in a given amount of resin.

As an option, the preheating step represented by the step 14 in FIG. 1 can be used to preheat the boat and batch in air to a temperature below its auto-ignition temperature prior to inserting the boat into the heated chamber of the oven. This step has the advantage of somewhat reducing the total residence time of the batch in the oven, and reducing the thermal shock to the oven which occurs when a cold boat and batch are introduced. Some heat energy can be recovered by using heat given off during cooling of a finished batch to preheat another boat containing a new batch.

At the end of the oven heating period according to block 16, the boat and treated batch are removed from the oven, and as shown in step 20, immediately confined within a second unheated chamber which is filled with inert gas. As soon as the treated batch enters the cooling chamber according to the step in box 20, a new batch confined in another boat is inserted, according to step 18, into the oven which is then reclosed to begin a new heating step according to box 16. The treated batch placed in the cooling chamber in step 20 is allowed to remain until the boat and batch are cooled below the auto-ignition temperature of carbon in air, and then the boat is removed from the chamber, step 22, and the product recovered from the boat in finished condition.

Figure 3:
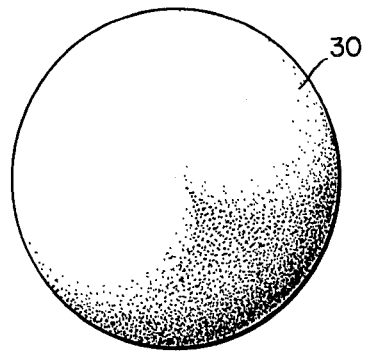

FIG. 3 shows a finished silicon carbide and carbon sphere 30 which is the product of the present process.

In the case where the siliceous material is glass, or contains substantial glass, it is easy for any uncombined glass to be removed from the finished product by treating it with hydrofluoric acid. This is useful if a product is desired which contains only silicon carbide and perhaps some carbon, and in which uncombined siliceous materials would represent an undesired impurity. This step is represented by the box 24 shown in FIG. 1.

This invention is not to be limited to the illustrative process described, for changes may be made within the scope of the following claims.

I claim:

1. The process of manufacturing shaped structures comprising silicon carbide and carbon, including the steps of:
   (a) collecting a batch of precursors of heat carbonizable synthetic resin material having dispersed therein siliceous material;
   (b) heating a first chamber to a temperature within a range from 2000° F. to 3000° F., and maintaining the chamber at said temperature;
   (c) enclosing a batch of said precursors within a graphite boat which substantially surrounds the precursors except for small openings sufficient to circulate gases through the boat;
   (d) confining and heating the boat and the batch in the heated chamber while flushing the chamber and boat with inert gases and full carbonizing the synthetic resin material;
   (e) converting at least 50% of the siliceous material to silicon carbide by continuing the heating of the boat and batch in the heated chamber for a time in the range of 4 to 24 hours to promote solid state reactions between the carbon formed from the resin material and the siliceous material, while continuously flushing the chamber and boat with inert gases;
   (f) subsequently removing the heated boat containing the batch from the first chamber and immediately confining it in a second unheated chamber in the presence of an inert atmosphere until the boat and batch are cooled below the auto-ignition temperature of carbon in air; and
   (g) recovering the shaped silicon carbide and carbon structures from the second chamber and boat.

2. The process of manufacturing a shaped structure as claimed in claim 1, wherein the siliceous material comprises finely pulverized silica dispersed in said resin material.

3. The process of manufacturing a shaped structure as claimed in claim 1, wherein the siliceous material comprises finely pulverized silica dispersed in said resin material, the quantity of silica relative to the quantity of carbon formed when the resin material is carbonized being in approximately stoichiometric ratio.

4. The process of manufacturing a shaped structure as claimed in claim 1, wherein the precursor comprises a phenolic resin as the synthetic material, and the siliceous material comprises glass spheres of the order of 20 to 130 microns dispersed in close mutual proximity in the resin.

5. The process of manufacturing a shaped structure as claimed in claim 1, wherein the temperature at which the first chamber is maintained is about 2700° F.

6. The process of manufacturing a shaped structure as claimed in claim 1, wherein the shaped structures recovered from the second chamber and boat are treated with hydrofluoric acid to remove any remaining siliceous material not combined with carbon.

7. A shaped structure of silicon carbide and carbon which is the product of the process claimed in claim 1.

8. The process of manufacturing shaped structures comprising silicon carbide and carbon, including the steps of:
   (a) forming precursors of heat carbonizable synthetic resin material having dispersed therein siliceous material, and curing the precursors to provide dimensional stability;
   (b) heating a first chamber to a temperature within a range from 2000° F. to 3000° F., and maintaining the chamber at said temperature;
   (c) enclosing a batch of said precursors within a graphite boat which substantially surrounds the precursors except for small openings sufficient to circulate gases through the boat;
   (d) confining and heating the boat and the batch in the heated chamber while flushing the chamber and boat with inert gases and fully carbonizing the synthetic resin material;
   (e) converting at least 50% of the siliceous material to silicon carbide by continuing the heating of the boat and batch in the heated chamber for a time in the range of 4 to 24 hours to promote solid state reactions between the carbon formed from the resin material and the siliceous material, while continuously flushing the chamber and boat with inert gases;
   (f) subsequently removing the heated boat containing the batch from the first chamber and immediately confining it in a second unheated chamber in the presence of an inert atmosphere until the boat and batch are cooled below the auto-ignition temperature of carbon in air; and
   (g) recovering the shaped silicon carbide and carbon structures from the second chamber and boat.

9. The process of manufacturing a shaped structure as claimed in claim 8, wherein the precursor comprises a phenolic resin as the synthetic material and the siliceous material comprises glass spheres of the order of 20 to 130 microns dispersed in close mutual proximity in the resin.

10. The process of manufacturing a shaped structure as claimed in claim 8, wherein the temperature at which the first chamber is maintained is about 2700° F.

11. The process of manufacturing a shaped structure as claimed in claim 8, wherein the shaped structures recovered from the second chamber and boat are treated with hydrofluoric acid to remove any remaining siliceous material not combined with carbon.

12. A shaped structure of silicon carbide and carbon which is the product of the process claimed in claim 8.

* * * * *